G. G. Griswold,
Making Augers,
N° 14,561. Patented Apr. 1, 1856.
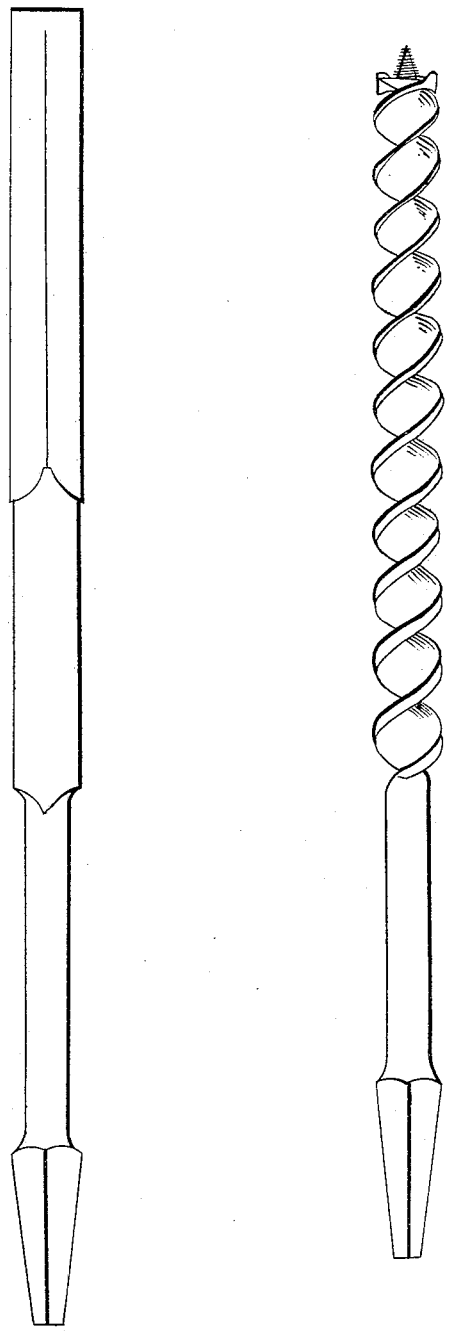

UNITED STATES PATENT OFFICE.

GEO. G. GRISWOLD, OF CHESTER, CONNECTICUT.

METHOD OF MANUFACTURING AUGERS.

Specification of Letters Patent No. 14,561, dated April 1, 1856.

*To all whom it may concern:*

Be it known that I, GEORGE G. GRISWOLD, of the town of Chester, county of Middlesex, and State of Connecticut, have invented a new and useful Improvement in Augers and Bits, and do hereby declare that the following is a full and exact description thereof, reference being had to the accompanying drawings and the references marked thereon.

The improvement consists in the form of the plate to make the auger or bit, and when twisted will give greater strength to the auger or bit, with a better cavity for the chip to pass up the twist.

To enable others skilled in the art to make and use my improvement, I will describe it as follows—viz—in forming the plate —A— for the auger or bit—it should be about one quarter thicker at the shank —B— with a flat surface—and to continue that thickness and surface—about one third the length of the plate —A— and the remainder of the plate A to be formed in a convex shape—leaving the center of the convex plate of about the same thickness of the center of the flat plate—so that when twisted it will be much stiffer and stronger combining the flat and convex twist.

What I claim as my improvement, is—

In the form of the plate required for making the twist to the auger or bit; the plate required, should be one quarter thicker at the shank—with a flat surface the width of the plate—and to continue that thickness and surface about one third of the length of the plate; the remainder of the plate to be made of a convex shape, thinner at the edge of the plate, with about the same thickness in the center, as the center of the flat plate—so that when twisted, it will form a flat and convex twist combined; the auger or bit being both stiffer and stronger--with a cavity which will raise the chip without changing its position—performing its work much easier and better.

GEO. G. GRISWOLD.

In presence of—
   CHAS. L. GRISWOLD,
   JOSHUA L. HOMMEDIEU.